E. A. SUNDVALL.
TIRE.
APPLICATION FILED FEB. 25, 1911.
1,003,071. Patented Sept. 12, 1911.
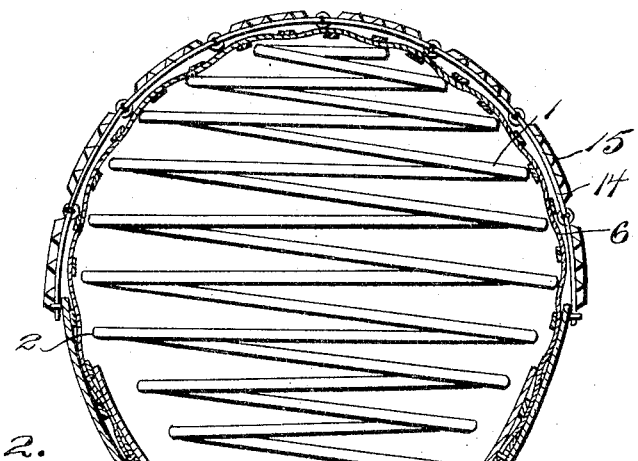
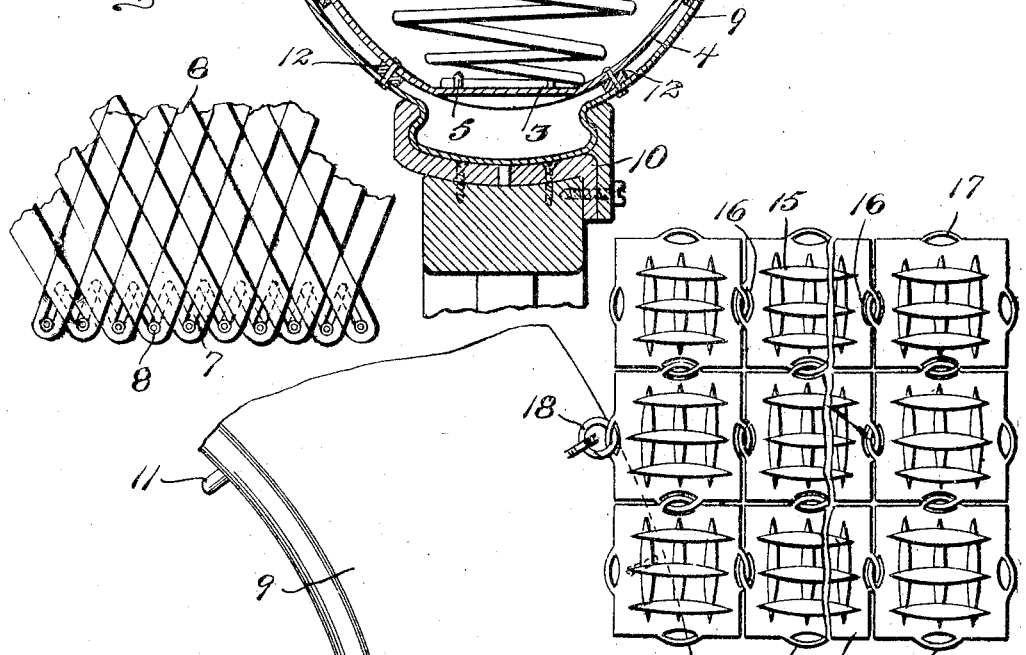
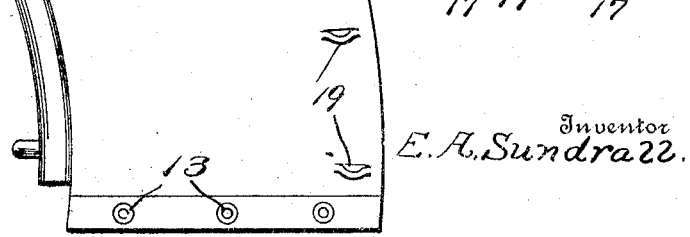
Witnesses
Inventor
E. A. Sundvall
By Attorneys

UNITED STATES PATENT OFFICE.

EDWIN A. SUNDVALL, OF STOCKHOLM, WISCONSIN.

TIRE.

1,003,071.

Specification of Letters Patent. Patented Sept. 12, 1911.

Application filed February 25, 1911. Serial No. 610,866.

*To all whom it may concern:*

Be it known that I, EDWIN A. SUNDVALL, citizen of the United States, residing at Stockholm, in the county of Pepin and State of Wisconsin, have invented certain new and useful Improvements in Tires, of which the following is a specification.

This invention comprehends certain new and useful improvements in tires for the wheels of automobiles and other vehicles, and the invention has for its primary object an improved construction of tire which will secure the required resiliency by the use of springs constructed and arranged in a novel and useful manner, and without the use of cushion or pneumatic tires or rubber, that are so liable to become punctured or otherwise damaged and rendered unfit for use.

With this and other objects in view, as will more fully appear as the description proceeds, the invention consists in certain constructions, arrangements and combinations of the parts that I shall hereinafter fully describe and claim.

For a full understanding of the invention reference is to be had to the following description and accompanying drawings, in which:—

Figure 1 is a transverse sectional view of a tire embodying the improvements of my invention. Fig. 2 is a fragmentary view of the protective layer of the device which is composed of flat steel springs, and Fig. 3 is a segmental view of the outer ring, illustrating in connection therewith a portion of the tread element which is composed of interlocked loosely connected plates.

Corresponding and like parts are referred to in the following description and indicated in all the views of the accompanying drawings by the same reference characters.

My improved tire embodies any desired number of cushioning springs 1 that are arranged in a circumferentially extending series, preferably close together, as illustrated in the accompanying drawing, each of the springs being preferably provided with relatively flat or straight side edges extending from about the middle parts toward the base, as indicated at 2, whereby the springs, when compressed may be permitted to spread laterally without injuriously affecting the enveloping parts.

In the present embodiment of the invention the cushioning springs 1 rest upon flat portions 3 of a channeled ring 4, said springs being connected together in any desired way, and being preferably secured to the flat portions 3 of the channeled ring 4 by means of clenching lugs 5, which are struck up from the sheet metal of which the part 4 is formed, and bent over the innermost or base portions of the springs so as to securely hold them in place. The series of springs 1 is enveloped by a protective layer composed of obliquely extending and transversely curved flat springs 6 that are interlaced, as best illustrated in Fig. 2. Preferably the ends of the springs 6 are relatively narrow, so that the entire protective layer will conform to the proper curvature necessary to encircle the rim of a wheel. The said ends are provided with longitudinally extending slots 7 which overlap and receive pivot studs or rivets 8, so as to yieldingly connect the ends of the springs 6 and permit the same to move one upon the other, when the tire is compressed, without any binding action. The springs 6 extend at their ends down between the channeled ring 4, and an outer complemental ring 9, the said rings being spaced from each other sufficiently to allow the proper freedom of movement of the springs 6. The ring 9 is seated in a groove or slot in the rim 10 of the wheel and is provided at any desired intervals with nibs 11 seated in sockets in the rim of the wheel whereby to prevent displacement of the ring. The ring 9 is secured in spaced relation to the inner ring 4 by means of any desired number of spacing blocks 12, arranged at any desired intervals and riveted or otherwise secured to the rings 4 and 9. Preferably the body portion of the tire thus formed is made in two semi-circular sections, whereby the tire may be easily applied to and detached from the rim of a wheel, the two sections having their ends overlapped and secured together by bolts 13 or similar fastening devices.

In connection with the body portion of my improved tire, I preferably employ a thread element which is composed of any desired number of sheet metal or malleable iron plates 14, said plates being dished, in order to correspond to the curvature of the body portion of the tire and each being preferably provided with nibs or protuberances 15 designed to produce a non-skidding surface. The plates 14 are formed at their adjoining edges with interlocking curved arms 16, so as to permit the requisite freedom of movement. The plates are also formed on their margin with slots 17 that are designed for engagement with split rings 18, the latter being in turn adapted to be secured to ears 19 that are struck up from the outer ring 9, in order to detachably secure the tread element to the body portion of the tire.

From the foregoing description in connection with the accompanying drawing, the operation of my improved tire will be apparent.

In the practical use of the device, the parts being assembled as shown in the drawing, any stress or impact imposed at any point upon the tread surface of the tire will be taken up by the protecting envelop composed of the springs 6, and be transmitted to the cushioning springs 1, all shocks being thereby effectively absorbed, and without the use of the cushion or pneumatic tires which are so liable to become injured and rendered unfit for service. Moreover, it is evident that a tire constructed in accordance with my invention will be relatively long lived, as the parts are of simple construction and durable, and not liable to get out of order.

It is, of course, to be understood that my invention is not limited to any particular construction of rim, or to any means of securing the tire to a rim.

Having thus described the invention what is claimed as new is:—

1. A tire of the character described, comprising a plurality of cushioning elements, means for supporting the same, a protective layer consisting of a plurality of obliquely extending interlaced flat springs formed at their overlapping ends with slots, rivet studs secured in said slots, the protective layer encircling the layer of cushioning elements, and means for holding the protective layer over the cushioning elements.

2. A tire of the character described, comprising a plurality of cushioning elements, an inner ring in which said elements are carried, said ring being channeled, an outer channeled ring, spacing devices encircled between the inner portions of said rings and connected to the same to hold them in spaced relation to each other, the outermost ring being formed at intervals with inwardly projecting nibs, for the purpose specified, a protective layer encircling the cushioning elements and having its side edges inserted in between the outer edges of the rings, and a tread element enveloping the protective layer and secured at its side edges to the outer ring.

In testimony whereof, I affix my signature in presence of two witnesses.

EDWIN A. SUNDVALL. [L. S.]

Witnesses:
A. S. OTIS,
L. A. WARREN.